United States Patent [19]
Jeantette et al.

[11] Patent Number: 6,046,426
[45] Date of Patent: Apr. 4, 2000

[54] METHOD AND SYSTEM FOR PRODUCING COMPLEX-SHAPE OBJECTS

[75] Inventors: Francisco P. Jeantette; David M. Keicher; Joseph A. Romero; Lee P. Schanwald, all of Albuquerque, N.Mex.

[73] Assignee: Sandia Corporation, Albuquerque, N.Mex.

[21] Appl. No.: 08/676,547

[22] Filed: Jul. 8, 1996

[51] Int. Cl.$^7$ ................................. B23K 26/00
[52] U.S. Cl. ................ 219/121.63; 219/121.64; 219/121.65; 219/121.66; 219/121.84
[58] Field of Search ............ 219/121.63, 121.64, 219/121.65, 121.66, 121.83, 121.6, 121.62, 121.84; 264/400, 402, 409, 497; 427/554, 556, 555, 596, 597

[56] References Cited

U.S. PATENT DOCUMENTS

| | | |
|---|---|---|
| 4,323,756 | 4/1982 | Brown et al. . |
| 4,603,257 | 7/1986 | Packer et al. ................ 250/358.1 |
| 4,665,492 | 5/1987 | Masters ................ 364/468.26 |
| 4,724,299 | 2/1988 | Hammeke . |
| 4,743,733 | 5/1988 | Mehta et al. . |
| 4,836,417 | 6/1989 | Uchiyama et al. ................ 222/63 |
| 4,863,538 | 9/1989 | Deckard ................ 156/62.2 |
| 4,927,992 | 5/1990 | Whitlow et al. ................ 219/121.65 |
| 4,938,816 | 7/1990 | Beaman et al. ................ 156/62.2 |
| 4,944,817 | 7/1990 | Bourell et al. ................ 156/62.2 |
| 5,017,753 | 5/1991 | Deckard ................ 219/121.63 |
| 5,038,014 | 8/1991 | Pratt et al. ................ 219/121.64 |
| 5,043,548 | 8/1991 | Whitney et al. ................ 219/121.47 |
| 5,111,021 | 5/1992 | Jolys et al. ................ 219/121.63 |
| 5,132,143 | 7/1992 | Deckard ................ 427/197 |
| 5,135,695 | 8/1992 | Marcus ................ 264/141 |
| 5,155,324 | 10/1992 | Deckard et al. ................ 219/121.64 |
| 5,160,822 | 11/1992 | Aleshin ................ 219/121.64 |
| 5,182,430 | 1/1993 | Lagain ................ 219/121.63 |
| 5,208,431 | 5/1993 | Uchiyama et al. ................ 219/121.63 |
| 5,245,155 | 9/1993 | Pratt et al. ................ 219/121.63 |
| 5,252,264 | 10/1993 | Forderhase et al. ................ 264/22 |
| 5,304,771 | 4/1994 | Griffin et al. ................ 219/121.63 |
| 5,398,193 | 3/1995 | deAngelis ................ 364/468 |
| 5,418,350 | 5/1995 | Freneaux et al. ................ 219/121.84 |
| 5,477,026 | 12/1995 | Buongiorno ................ 219/121.84 |
| 5,512,162 | 4/1996 | Sachs et al. ................ 205/91 |
| 5,530,221 | 6/1996 | Benda et al. ................ 219/121.83 |
| 5,578,227 | 11/1996 | Rabinovich ................ 219/121.63 |

(List continued on next page.)

FOREIGN PATENT DOCUMENTS

| | | | |
|---|---|---|---|
| 370967 | 5/1990 | European Pat. Off. | .......... 219/121.83 |
| 490146 | 6/1992 | European Pat. Off. | .......... 219/121.83 |
| 64-87713 | 3/1989 | Japan | ................ 219/121.62 |
| 4-84684 | 3/1992 | Japan | ................ B23K 26/00 |
| 2227964 | 8/1990 | United Kingdom | ............. 219/121.84 |

OTHER PUBLICATIONS

A. Frenk, et al., Journal de Physique IV, Laser Cladding with Cobalt–Based Alloys, Colloque C7, supplement au Journal de Physique III, vol. 1, Dec. 1991, pp. C7–65–C7–68.

(List continued on next page.)

*Primary Examiner*—Geoffrey S. Evans
*Attorney, Agent, or Firm*—Brian W. Dodson; Timothy D. Stanley

[57] ABSTRACT

A method and system are provided for producing complex, three-dimensional, net shape objects from a variety of powdered materials. The system includes unique components to ensure a uniform and continuous flow of powdered materials as well as to focus and locate the flow of powdered materials with respect to a laser beam which results in the melting of the powdered material. The system also includes a controller so that the flow of molten powdered materials can map out and form complex, three-dimensional, net-shape objects by layering the molten powdered material. Advantageously, such complex, three-dimensional net-shape objects can be produced having material densities varying from 90% of theoretical to fully dense, as well as a variety of controlled physical properties. Additionally, such complex, three-dimensional objects can be produced from two or more different materials so that the composition of the object can be transitioned from one material to another.

33 Claims, 9 Drawing Sheets

U.S. PATENT DOCUMENTS

| | | | |
|---|---|---|---|
| 5,607,730 | 3/1997 | Ranalli | 427/596 |
| 5,612,099 | 3/1997 | Thaler | 427/596 |
| 5,647,931 | 7/1997 | Retallick et al. | 156/73.6 |
| 5,837,960 | 11/1998 | Lewis et al. | 219/121.63 |

OTHER PUBLICATIONS

K. M. Jasim, et al., Journal of Materials Science 25 (1190) 4948, Thermal barrier coatings produced by laser cladding, pp. 4943–4948.

Subramanian, et al, Journal of Materials Science, Laser cladding of Xirconium onmagnesium for improved corrosion properties, 26 (1001)951 956,—. 951–956.

Damborenea, et al, Journal of Materials Science, Laser cladding of high–temperature coatings, 28 (1993) 4775–4780 pp. 4775–4780.

Mazumder, et al, Research Summary, Solid Solubility in Laser Cladding, Journal of Metals, Feb. 1987, pp. 18–23.

Kizaki, et al, Jpn. J. Appl. Phys., Phenominological Studies in Laser Cladding, Part II, Thermometrical Experiments on the Melt Pool, vol. 32 (1993), pp. 213–220.

Xin, et al, Key Engineering Materials, Maximum Thickness of the Laser Cladding, vols. 46 & 47 (1990) pp. 381–386.

L. P. Schanwald, "Two Powder Stream Diagnostics for Laser Deposition Processes," ICALEO '95 the 14th International Congress on Applications of Lasers & Electro–optics, San Diego, CA (Nov. 13, 1995–Nov. 16, 1995).

L. P. Schanwald, "Two Thermal Monitors for High Power Laser Processing," 1996 World Congress on Powder Metallurgy and Particulate Materials, Metal Powders Industried Federation, Washington, DC (Jun. 16, 1996–0;Jun. 21, 1996).

Digital Light Fabrication, article released by Los Alamos National Laboratory (approximately Spring 1996) authors unknown.

Matrice Technology ISSN 1066–7857, Materials Technology, Mar./Apr. 1995, vol. 10, No. ¾, *Direct Laser Metal Deposition Process Fabricates Near–Net–Shape Components Rapidly*.

R&D 100, 82$^{nd}$ Annual R&D 100 Awards, A Cahners Publication/Sep. 1994. *Laser fusing Forms Complex Metal Parts*.

Dateline Los Alamos, A Monthly Publication of Los Alamos National Laboratory, Sep. Issue 1994, *Directed–Light Fabrication of Complex Metal Parts*.

Gary K. Lewis, John O. Milewski, Ronald B. Nemec, Michael R. Barbe, *Directed Light Fabrication*, 13$^{th}$ International Congress on Aplications of Lasers and Electro–Optics, Oct. 17–20, 1994, Airport marriott Hotel, Orland, Florida.

Gary K. Lewis, Ron Nemec, John Milewski, Dan J. Thoma, Dave Cremers, Mike Barbe, *Directed Light Fabrication*, ICALEO'94 Laser Institute of America Proceedings, Oct. 17–20, 1994, Airport Marriott Hotel, Orlando, Florida.

J. P. Kruth, B. Van der Schueren, *Direct Production of Metallic Parts by Rapid Prototyping, Proceedings of the 12$^{th}$ International Congress* (Laser '95), Bamberg, Meisenbach, 1995.

Harris L. Marcus, Joseph J. Beaman, Joel W. Barlow, and David L. Bourell, Solid Freeform Fabrication: Powder Processing, Ceramic Bulletin, vol. 69, No. 6, 1990.

METHOD AND SYSTEM FOR PRODUCING COMPLEX-SHAPE OBJECTS

This invention was made with Government support under Contract No. DE-AC04-94AL85000 awarded by the United States Department of Energy. The Government has certain rights in the invention.

BACKGROUND OF THE INVENTION

This invention relates generally to the selective deposition of a material onto a substrate, and more particularly to a method and system for the deposition of a continuous stream of laser-melted powdered material to form complex, net-shape objects.

Since their development in the early 1960's, lasers have evolved to a practical tool for industrial materials processing. In the last decade, laser cladding of materials has proven to be a technology which satisfies industrial requirements for a variety of applications. In particular, laser cladding of similar or dissimilar materials for improved wear properties, corrosion resistance, thermal barrier coatings, etc. has been developed. R. Subramanian et al. in *J. Material Science* 26, 951 (1991), and C. Xin et al. in *Key Engineering Materials* 46 & 47, 381 (1990) describe laser cladding in which a surface is exposed to a laser beam, and powder is fed from a single off-axis position onto the surface where the powder is melted and bonded to the surface. Typical applications are for hardfacing and improved corrosion resistance of the substrate. More recently, a process similar to laser cladding for generating solid metal objects has been described wherein laser powder or wire deposition to rebuild and/or produce solid geometries has been used. U.S. Pat. No. 4,323,756 teaches the building up of solid articles by impinging an energy beam onto a surface sufficient to melt it, and introducing powder or wire feedstock into the molten zone from a single off-axis position.

In the development of the laser deposition system of the present invention, it was found necessary to introduce the powdered material into the laser beam at the precisely correct position. With previous single-port, off-axis nozzle laser-powder deposition techniques, low-frequency periodic fluctuations in the powder flow rate lead to non-uniform deposition regions. When the low-frequency fluctuations occurred, a comb-like periodic structure was generated in the deposited material. These fluctuations resulted in variations in deposition-surface height and introduced instabilities in laser and powder interactions at the workpiece, producing inconsistent results. Since the laser beam can be significantly attenuated or even defocused by injection of the powdered material into the beam at a point other than minimum beam diameter, it is necessary to introduce the powdered material with some precision. In particular, we have discovered that introducing a converging stream of powdered material at an angle as nearly normal to the work surface as possible, and at or near the minimum laser beam diameter can dramatically improve the quality of the resulting objects. Additionally, we have found that it is important to inject the powdered material symmetrically into the laser beam independent of the direction of relative motion of the workpiece with respect to the laser beam so as to produce objects with uniform geometries. The laser deposition system of this invention satisfies all the foregoing needs providing a method for direct manufacture of complex metallic, ceramic, glass and plastic as well as composite net-shape objects.

The present invention satisfies the long felt need for a successful laser deposition process in which a stream of powder transported in a gas intersects a focused laser beam; is melted thereby, either in flight or upon injection into a molten puddle, and is deposited onto a substrate. Scanning the laser beam over a deposition stage, or moving the deposition stage relative to the laser beam, while maintaining a sharp focus on or near the surface being deposited thereon allows the generation of solid objects of varying geometry in a layer-wise manner.

SUMMARY OF THE INVENTION

The present invention provides a method and system for the production of complex, net-shaped objects whereby a stream of powdered material is directed into a focused laser beam, is melted thereby and is deposited onto a deposition stage to generate solid objects of varying three-dimensional complexity in a layerwise manner. In particular, the laser deposition system of the present invention includes a powder delivery system which introduces a converging stream of powdered material into the laser beam at or near the beam's minimum diameter (i.e. focus or focal plane) at an angle nearly normal to a deposition surface whereby uniform geometries of three-dimensional objects can be produced independent of relative motion of the deposition surface with respect to the laser beam. The laser deposition system also includes a powder feeder to provide a continuous, uniform flow of powdered material whereby measured amounts of powdered material can be delivered to the powder delivery system. Multiple powder feeders capable of simultaneous operation can provide controlled, varying amounts of different kinds of powdered material to the powder delivery system to achieve composite structures in a programmed way. In particular, the powdered materials can be selected from metals, ceramics, glasses and plastics. Different carrier gases for powder transport from the powder feeder to the delivery system can be used to effect desirable chemical and structural changes in the deposited material.

The present invention uses a powder mass-flow sensor capable of resolving periodic variations in the powder flow to provide a signal for closed-loop process control of powder flow, and an optical pyrometer to measure the temperature in the deposition region for closed-loop process control of the laser power to regulate the temperature in the deposition region. A laser-based triangulation device can be attached to the delivery system to sense the relative position between the delivery system and the workpiece as well as the rate of change in position between the two. The positional information so obtained provides a signal for closed-loop feedback control to maintain the focal plane of the laser a constant distance from the deposition surface. This positional information allows an interactive software driver to modify the deposition parameter to correct for errors in the deposition process. Velocity information obtained from the position information can be used to regulate laser power, and thereby maintain constant volumetric exposure at any position on the deposited layer.

BRIEF DESCRIPTION OF THE DRAWINGS

The accompanying drawings, which are incorporated in, and form part of, the specification, illustrate embodiments of this invention and, together with the description, serve to explain the principles of the invention.

DETAILED DESCRIPTION OF THE INVENTION

A method and system are provided for producing complex, three-dimensional, net shape objects from a variety of powdered materials. The system includes unique components to ensure a uniform and continuous flow of powdered materials as well as to focus and locate the flow of powdered materials with respect to a laser beam which results in the melting of the powdered material. The system also includes a controller whereby the flow of molten powdered materials can map out and form complex, three-dimensional objects by layering the molten powdered material. Advantageously, such complex, three-dimensional net-shape objects can be produced having material densities varying from 90% of theoretical to fully dense, as well as a variety of controlled physical properties. Additionally, such complex, three-dimensional objects can be produced from two or more different materials whereby the composition of the object can be graded from one material to another.

Figure 1:
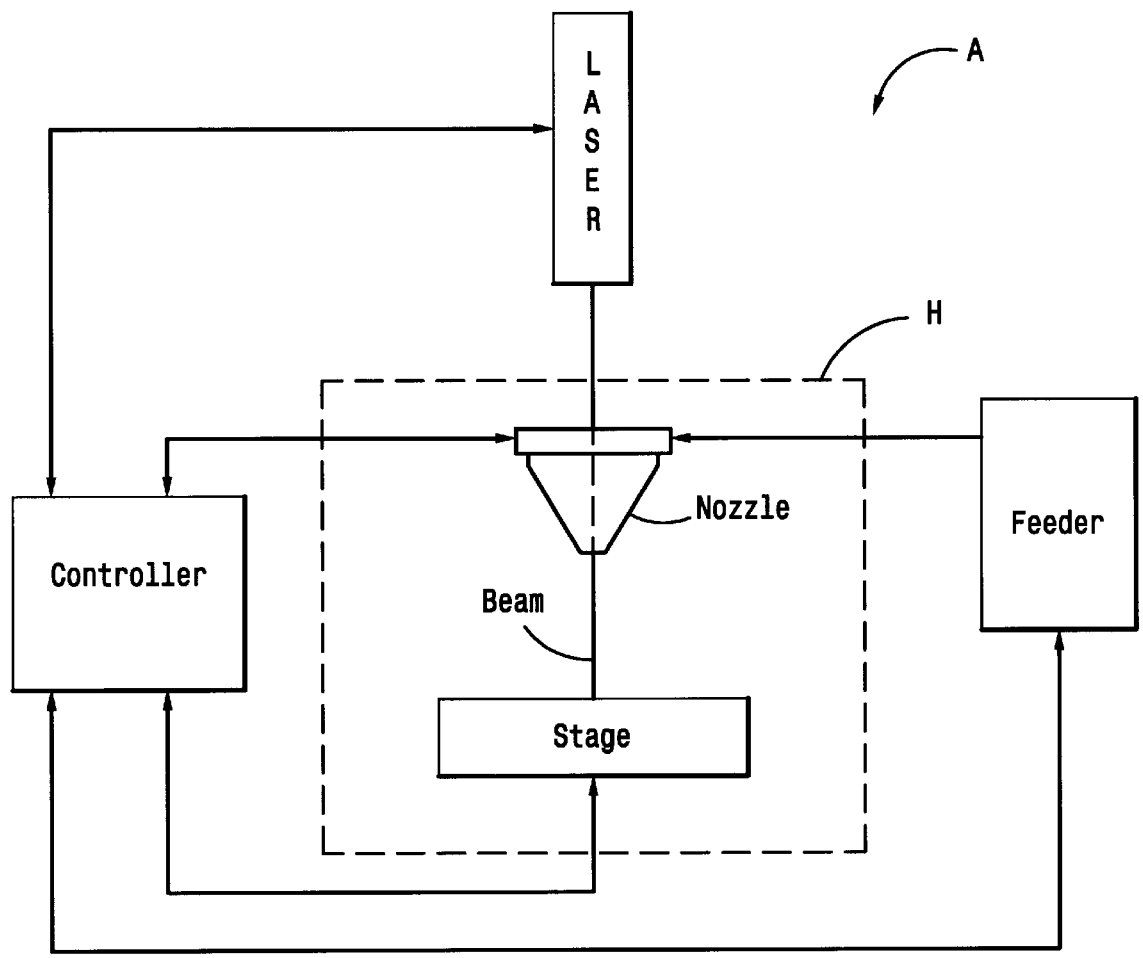
FIG. 1 is a schematic depiction of one embodiment of the present invention.

The present invention provides a method and system for producing complex net-shape objects. FIG. 1 depicts schematically one embodiment of the present invention. In particular, a laser deposition system A generally comprises: a powdered material feeder F, a material delivery system N, a laser L, a deposition stage S, and a computer controller C. A more detailed explanation of each of these components, as well as alternative embodiments, will be described in more detail below.

To better understand the present invention, a brief description of the laser deposition system A will be provided. In operation, the powdered material feeder F provides a uniform and continuous flow of a measured amount of powdered material to the delivery system N. The delivery system N directs the powdered material toward the deposition stage S. Moreover, the delivery system N directs the powdered material to flow in a converging, conical pattern whereby the apex of such converging, conical pattern intersects the minimum diameter of a focused laser beam B (i.e. focus or focal plane) produced by laser L, all of which is in close proximity to the surface of deposition stage S. Hereafter, such intersection of such powdered material and laser beam B will be referred to as a "melt zone." As a consequence, a substantial portion of the powdered material melts and is deposited on the surface of deposition stage S. Those skilled in the art will appreciate that such powdered material can melt either in flight or upon injection into a molten puddle of powdered material. By causing the deposition stage S to move relative to the melt zone (e.g., by moving the deposition stage S relative to the delivery system N, or by moving the delivery system N relative to the deposition stage S, or such combination of both deposition stage S and delivery system N moving relative to each other), layers of molten powdered material can be deposited to form a net-shape object of varying complexity. Initially, a layer is deposited directly on the deposition stage. Thereafter, subsequent layers can be deposited on previous layers until the desired three-dimensional object is formed.

The deposition process is performed in a controlled atmosphere chamber H which contains an inert gas to inhibit the formation of surface oxide in the deposition area. This allows a minimum laser energy to be used to achieve full melting of the powder powdered material as they are injected into the deposition area. Although deposition can be performed outside the controlled atmosphere chamber H, it is likely that the inert atmosphere promotes fill density in the deposited structures and ultimately leads to improved strength and ductility in the deposited structure when a laser conditions are maintained to provide rapid cooling in the deposition area.

Computer controller C ensures the coordinated operation of all components of the laser deposition system A. For example, computer controller C regulates: the flow of powdered material from the powdered material feeder F, the power level of laser L, the vertical (z-axis) position of delivery system N relative to the deposition stage S, and the horizontal (x, y-axes) position of deposition stage S relative to delivery system N. By employing these and other control signals to be described below, complex, three-dimensional net-shape objects can be produced from a variety of powdered materials having unique material properties.

In the development of the laser-powder deposition technique of the present invention, it was found necessary to introduce the powdered material into the laser beam B at the precisely correct position. With previous single-port, off-axis nozzle designs, low-frequency periodic fluctuations in the powder flow rate resulting from the movement of the workpiece relative to the laser beam and injected powdered material lead to non-uniform deposition regions. When such low-frequency fluctuations occur, a comb-like periodic structure is generated in the deposited material. These variations in deposition-surface height introduce instabilities in laser and powder interactions at the workpiece, producing inconsistent results. Since the laser beam can be significantly attenuated or even defocused by injection of the powdered material into the beam at a point other than minimum beam diameter, we have discovered that it is necessary to introduce the powdered material with some precision. The optimum configuration would introduce a converging stream of powdered material at an angle as nearly normal to the deposition surface as possible, and at or near the minimum laser beam diameter. Additionally, we have found that the symmetrically injecting powdered material into the laser beam independent of horizontal direction of travel of the workpiece allows uniform three-dimensional geometries to be produced. The laser deposition system A of this invention satisfies all the foregoing requirements providing a method for direct manufacture of complex metallic, ceramic, glass, plastic and composite objects.

The present invention thus satisfies the long felt need for a successful laser deposition process in which a stream of powdered material transported in a carrier gas intersects a focused laser beam; is melted thereby, either in flight or upon injection into a molten puddle, and is deposited onto a deposition stage. Scanning the laser beam over the deposition stage, or moving the deposition stage relative to the beam, while maintaining a sharp focus of the laser beam and the flow of powdered material on or near the surface being deposited thereon allows the generation of three-dimensional objects of varying geometry in a layer-wise manner.

Powder Feeder

Figure 2:
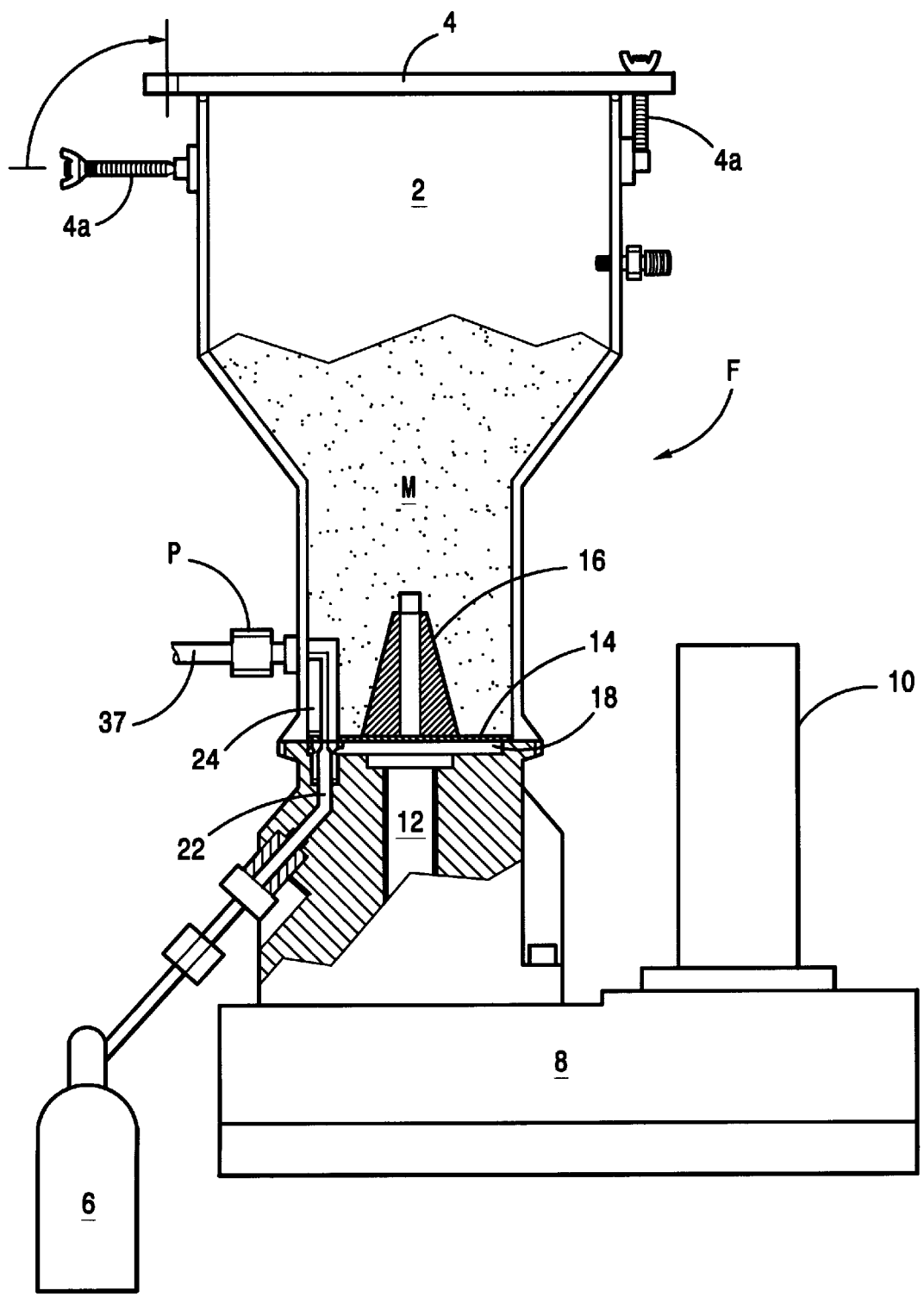
FIG. 2 is a cross-sectional view of a powder feeder.

Looking next to FIG. 2, powder feeder F comprises a powder hopper 2 which can be pressurized to several atmospheres. The hopper 2 is adapted to hold a variety of powdered materials M and is sized so as to have sufficient capacity to operate the laser deposition system A for several hours without interruption for refilling. The hopper 2 includes a lid 4 which sealably contains the powdered material M therein under pressure.

By way of example, lid 4 can be secured to hopper 2 with bolts 4a. The hopper 2 can be pressurized with a propellant or carrier gas from gas container 6. As will be explained more fully below, the gas acts as a propellant to eject the powdered material M from hopper 2, and carry it to the delivery system N. As will be explained in more detail below, different propellant or carrier gases can be used to effect desirable chemical and structural changes in the deposited material and thus produce truly unique complex, net-shape objects. As depicted in FIG. 2, hopper 2 has a generally downward converging shape to ensure the smooth flow of powdered material M.

Figure 3A:
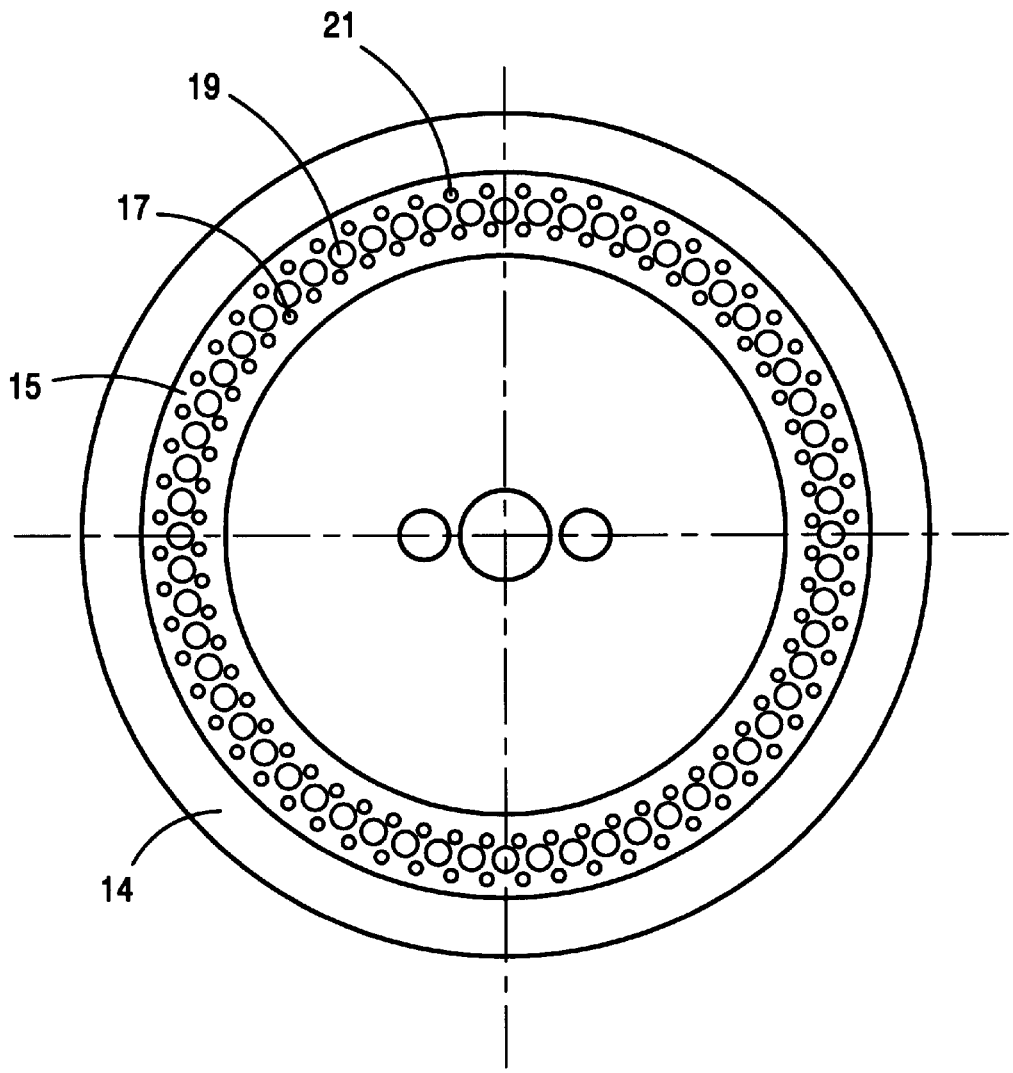
FIGS. 3a and 3b are top and side views of the powder feeder wheel, respectively.
Figure 3B:
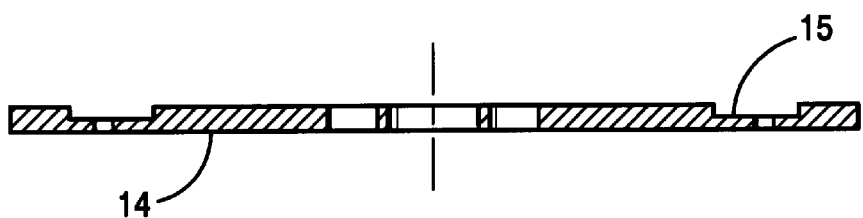

The hopper 2 is mounted atop a base plate 6 whereby a motor 10 can be connected via drive shaft 12 to hopper 2. Rotatably mounted at the base of hopper 2 is feeder wheel 14, secured to drive shaft 12 with mounting hub 16. Feeder wheel 14 thus can rotate when driven by motor 10. Feeder wheel 14 slidably engages a stationary plate 18 mounted with hopper 2. Feeder wheel 14, as more clearly depicted in FIGS. 3a and 3b, includes a groove 15 with concentric rings of alternating size holes, 17, 19, and 21 providing flow passageways through feeder wheel 14. The middle holes 19 have approximately twice the area of holes 17 and 21. Holes 17, 19, and 21 are not radially aligned, but rather, are offset one from another, to ensure uniform flow of powdered material M. The holes 17, 19, and 21 are sized to deliver a measured amount of powdered material from the hopper 2, and thus uniform, to the delivery system N. By varying the speed of rotation of the feeder wheel 14, the amount of powdered material being delivered can be regulated.

Figure 4:
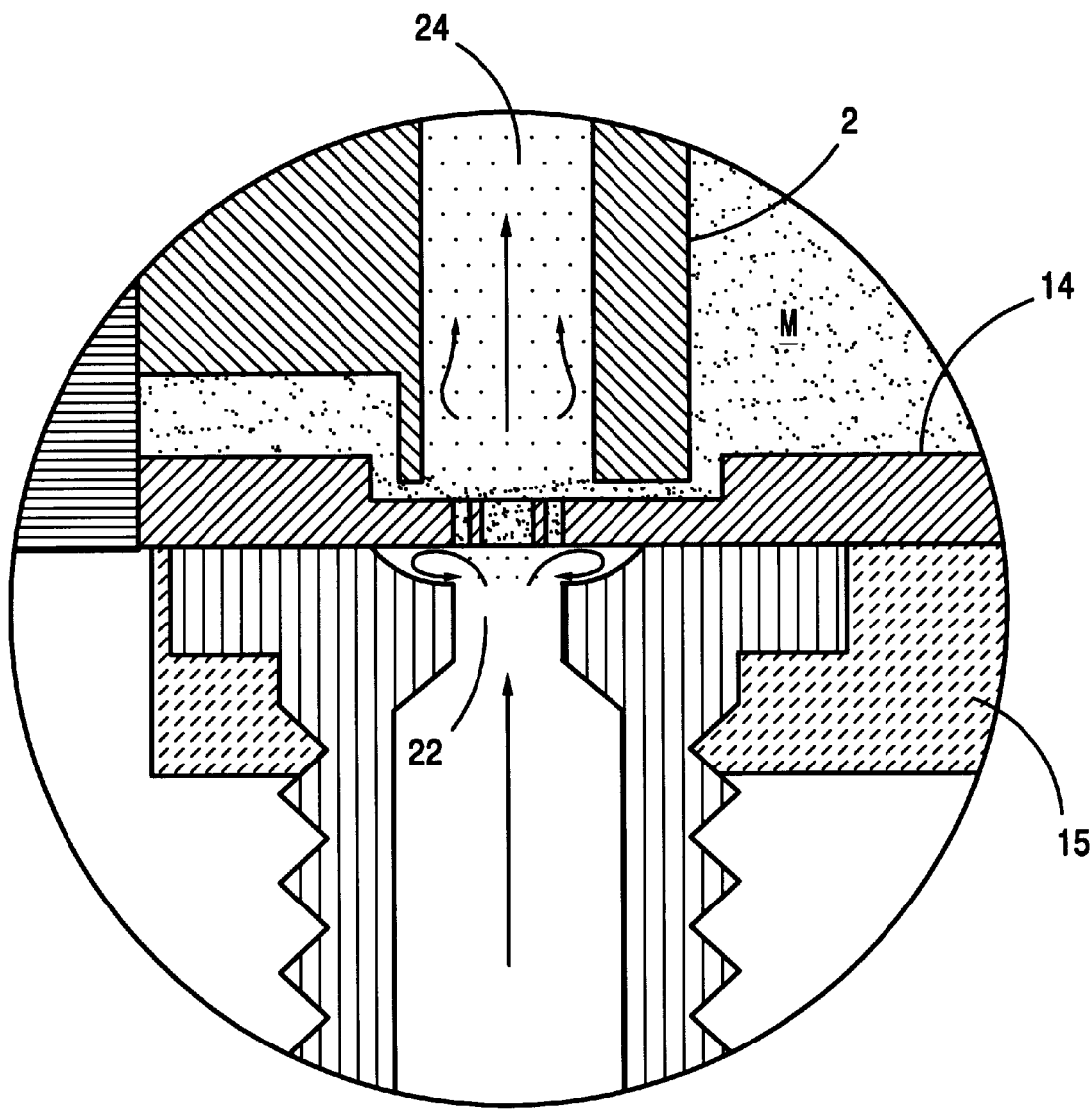
FIG. 4 depicts a schematic cross-sectional view of the alignment of the gas inlet, feeder wheel, flow passageways, and gas-powder mixture outlet.

Looking now to FIG. 4, The hopper 2 also includes a slotted gas inlet 22 which is in fluid communications with gas container 6. Slotted gas inlet 22 is positioned beneath feeder wheel 14 and radially aligned therewith. Positioned above feeder wheel 14 is outlet 24. Outlet 24 and inlet 22 are in vertical alignment such that when any one of the holes 17, 19, or 21 in feeder wheel 14 come into register therewith, gas from gas container 6 can flow therethrough, and turbulent gas flow is induced resulting in the mixing and ejection of powdered material M to delivery system N. The feeder wheel 14 rotates at approximately 1–60 rpm, and as it rotates, a measured amount of powdered material M contained within groove 15 and holes 17, 19, and 21 can be transported into the region containing the inlet 22 and outlet 24 regions.

The slotted gas inlet 22 allows the offset-hole feature of the feeder wheel 14 to be fully exploited. The slotted gas inlet 22 can have a wide range of inside diameters (ranging from approximately 0.01 in. to over 0.3 in.), and slot sizes (ranging from approximately 0.01 in. to over 0.3 in.) that can create a turbulent, uniform, mixing effect for various powder sizes and densities.

The outlet 24 can have inside diameters ranging from approximately 0.01 in. to over 0.3 in. The wall of hopper 2 serves as a wiper to brush away excess powdered material from the surface of the feeder wheel 14 and regulate the powder volume delivered to the delivery system N. As the feeder wheel 14 rotates past the wall of hopper 2, only the powdered material contained within the holes 17, 18, and 21 is carried forward, With the inlet 22 positioned beneath the feeder wheel 14 and outlet 24, a percolating effect occurs to provide mixing of powdered maaterial which serves to further eliminate the low-frequency fluctuations observed with existing commercial powder feed units.

Powder Flow Sensor

A fast-response, light-scattering, powder mass-flow sensor P depicted in FIG. 2 is located downstream from powder feeder F and upstream from delivery system N, and is used to detect any periodic fluctuation in the powder stream coming from the feeder F, and ensures that the powder feeder F does not produce low-frequency fluctuations in the powder stream. Sensor P uses a diode laser as its light source and several photodiodes as sensors to measure both the forward and backward scattered signals. The powder flow sensor P measures the flow of the powdered material to the delivery system N, and produces either a relative mass-flow signal or a calibrated mass-flow signal for a particular powdered material. The sensor P also provides a means of measuring pulsations or variations in the flow pattern, and provides a method to indicate if unstable operating conditions are present. The useful operational range of the powder flow sensor P is approximately 0.05 gram per minute (gpm) to over 100 gpm., with a gas-stream flow of approximately 1 cubic foot per hour (cfh) to over 100 cfh.

Figure 5:
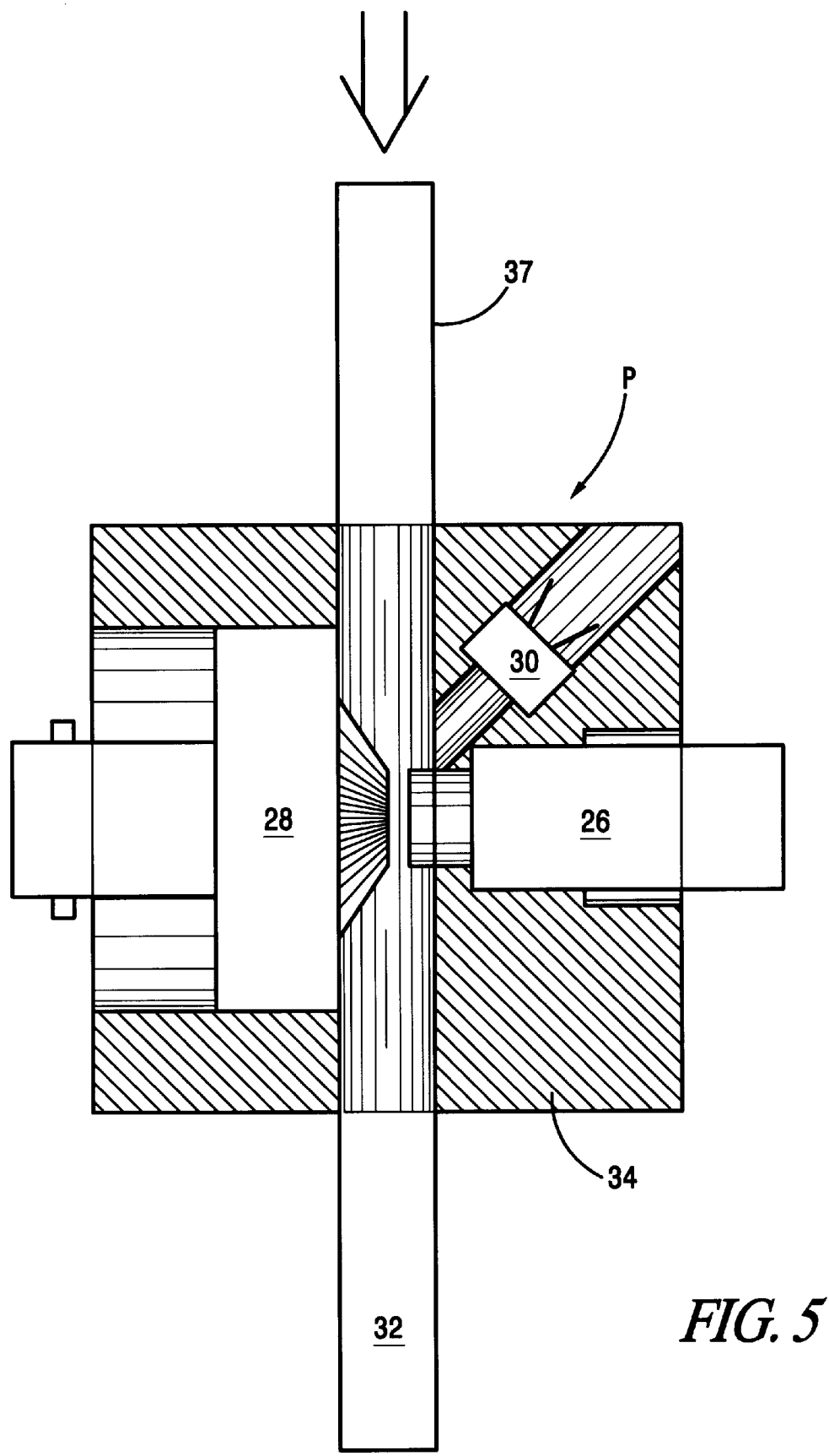
FIG. 5 depicts the powder-flow sensor.

The flow sensor P uses light-scattering techniques to measure the mass flow of powdered material suspended in a carrier gas. The flow sensor P is depicted in FIG. 5. The flow sensor includes a light source 26, a forward scatter detector 28, a back scatter detector 30, and an optically transparent tube 32, all mounted together in a sensor block 34. A gas/powder line 37 is attached to the optically transparent tube 32 where light from the light source 26 passes through the powder stream in the optically transparent tube 32 perpendicular to direction of travel of the powder stream. The forward scattered light is collected by a large area (~1 $cm^2$) detector within a range of approximately 45 degrees around the axis of light source 26. Back scattered light is also collected by a smaller detector 34 at an angle from approximately 0–90 degrees to the light source 26 axis. Apertures can be used with either the forward or back scatter detectors 28 or 30 to isolate scattered light in a particular solid angle. Different light sources 26 (such as a laser diode, LED, incandescent lamp, etc.) can be used. Different types of forward- and back-scatter detectors (photovoltaic, photoconductive, etc.) can also be used.

Figure 6:
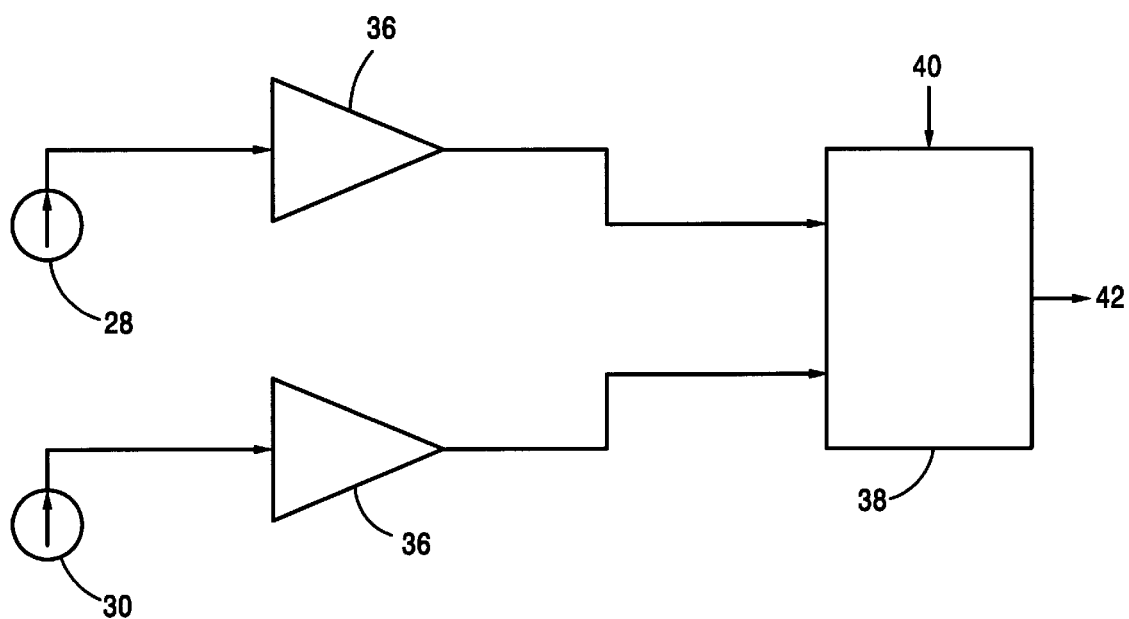
FIG. 6 depicts a control circuit for the powder flow sensor.

One of several possible circuits to create a mass flow signal from the powder mass flow sensor P is shown in FIG. 6. The signals from the forward 28 and backscatter 30 detectors, shown as circles with an arrow, are amplified with transimpedance amplifiers shown as triangles above. The amplifier's voltage outputs are sent to the analog divide function shown as a square above. The unterminated input at the top of the square is an offset adjustment. This analog divide function output is proportional to the mass flow of the powder flow sensor P measures.

In general, the powder flow sensor P is scalable in size and quantity of powder flow being measured. That is, it is not limited in theory to a particular sensor head size or volumetric range of powder flow. Not shown are various apertures that may be used in conjunction with either the forward or back scatter detectors familiar to those skilled in the art. These can be added to isolate scattered light in a particular solid scatter angle to a detector. These can enhance the sensor for measurement of smaller particles (smaller than or equal to the wavelength of measurement light).

Delivery System

Among several possible designs for delivery systems N is one that provides a coaxial flow of powdered material to the melt zone. However, a full-perimeter coaxial-nozzle design makes it difficult to ensure either a uniform flow of powdered material or to direct the powdered material only to the desired region, significantly reducing the efficiency of powdered material utilization. A further problem with the coaxial flow of the powdered material is that the powdered material enters the laser beam over a larger vertical distance rather than just within the melt zone. Finally, the large mass flow rates typical of a coaxial nozzle make it difficult to remove unused powdered material from the surface for proper deposition of subsequent layers.

Figure 7:
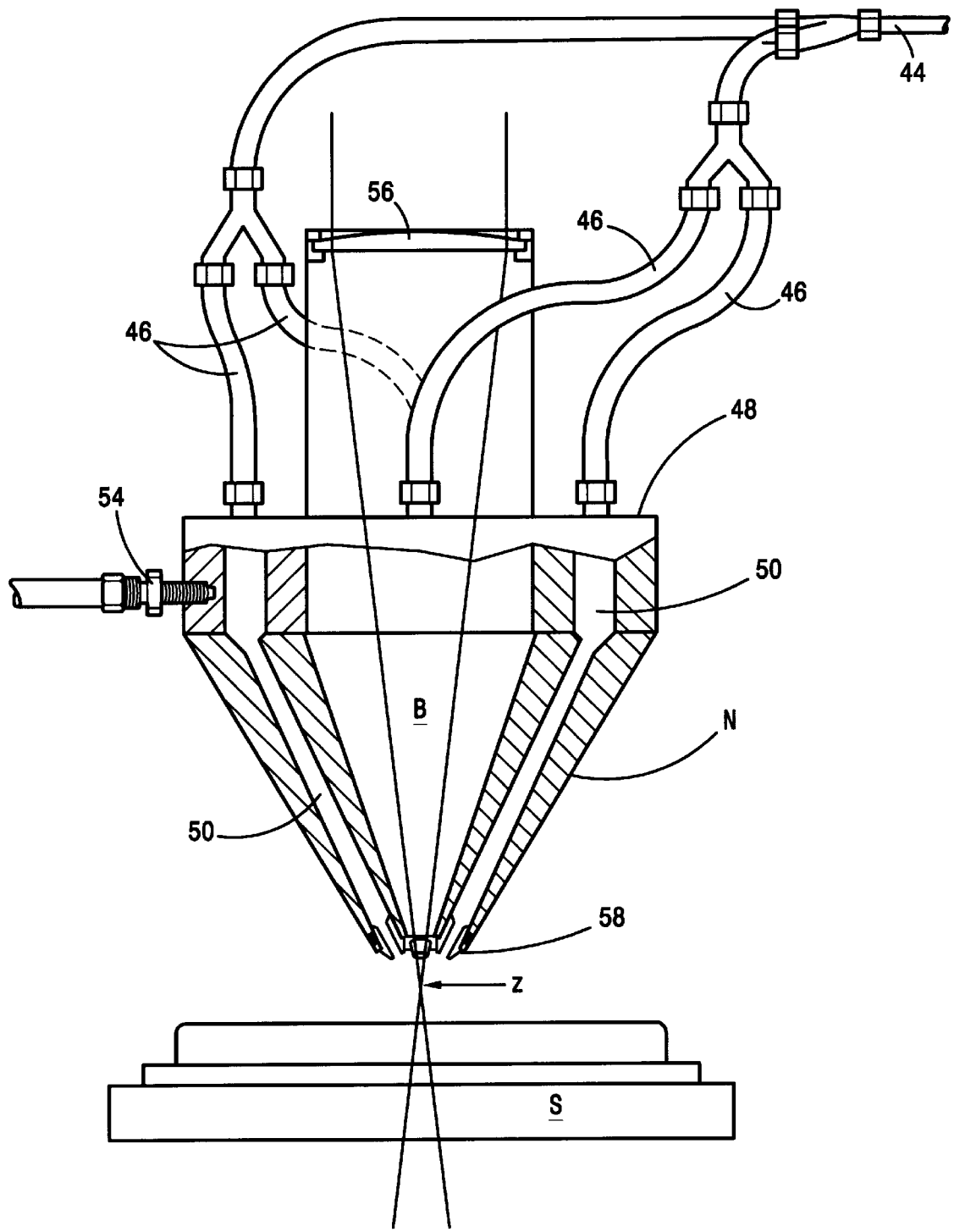
FIG. 7 is a partially cross-sectional view of the delivery system.
Figure 8:
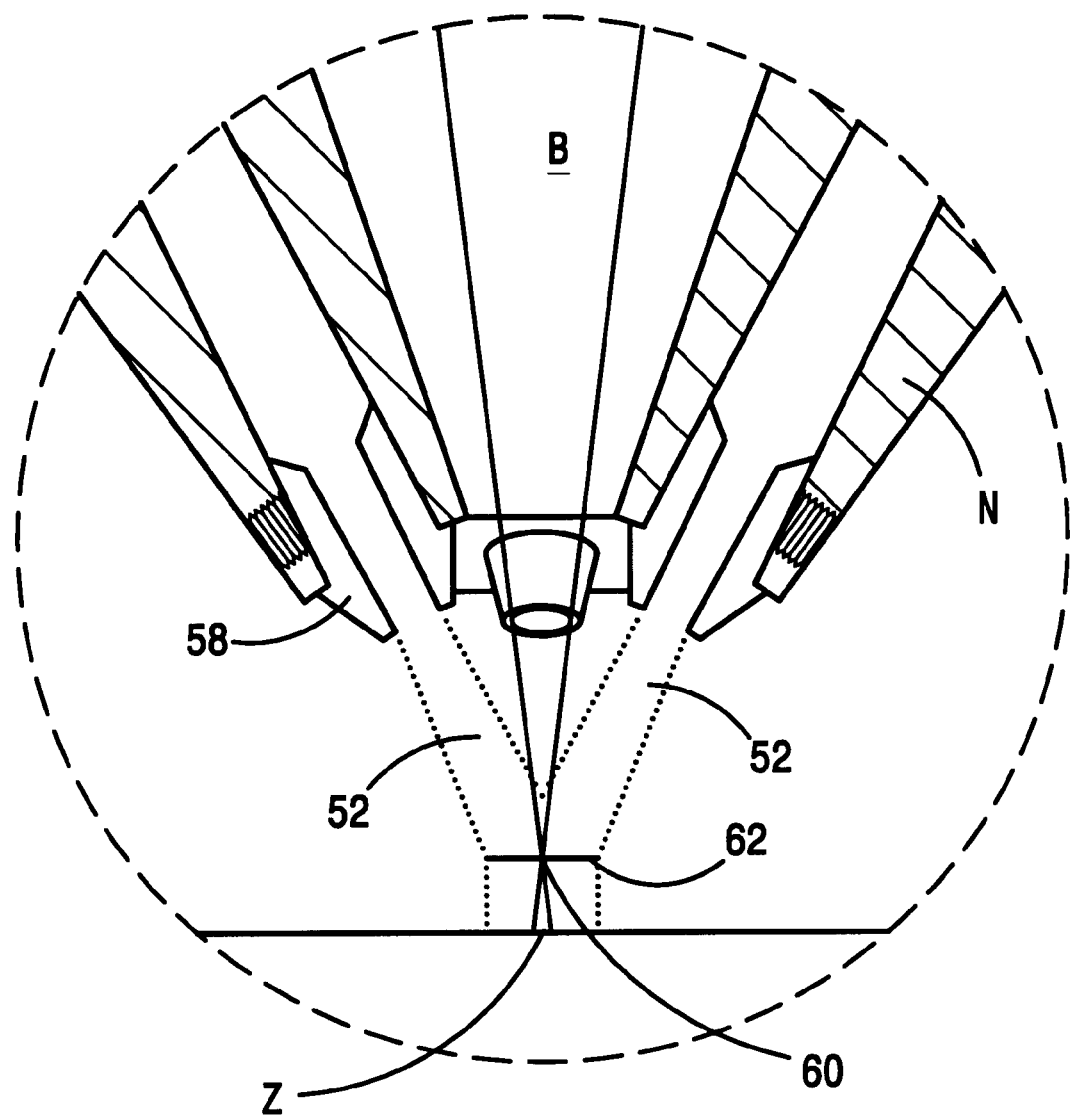
FIG. 8 is a more detailed view of the powdered material-laser interaction zone.

Once the powdered material is entrained in the carrier gas stream at powder feeder F, it is carried to the delivery system N shown in FIGS. 7 and 8 by gas/powder line 44. The powder stream can be divided into four individual streams in four separate lines 46. The four lines 46 spaced 90 degrees apart act as an input manifold for the delivery system N and are connected to four individual ports 48 which are integral, respectively, with four channels 50 which deliver powdered material to the melt zone Z by way of four jets 52 of powdered material from off-axis positions as shown in FIG. 8. Those skilled in the art will appreciate that any number of jets 52 uniformly spaced about the delivery system N will produce the desired uniform flow of powdered material to the workpiece. The conical shape of the four channels 50 provides internal angular relief (ranging from about 10 degrees to about 30 degrees) to allow a focused laser beam B to pass through the delivery system N without being attenuated. A shielding-gas port 58 supplies an inert gas, coaxial with the laser beam B, to prevent powdered material from being deposited backward onto a laser focusing apparatus 60. In addition, the conical shape of the delivery system N provides an angle of trajectory (ranging from about 10 degrees to about 40 degrees) for the four jets 52 directed into the melt zone Z.

As a means of focusing the powdered material in the melt zone and matching the powder stream diameter to the laser beam diameter, small removable nozzle inserts 58, shown in FIG. 8, are mounted at the end of each of the four channels 50. These nozzle inserts 58 allow the powder jet 52 diameter to be varied to satisfy process or powder requirements, and can have inside diameters ranging from approximately 0.01 in. to over 0.1 in. The inside diameters of the nozzle inserts 58 and the diameters of the channels 50 are chosen to permit free flow of powdered material depending on the size, shape, and other flow characteristics of the powdered material.

To avoid attenuation or scattering of the laser beam B, the powder jets 52 intersect each other and the laser beam B at the focal point 60 or focal plane 62 of the laser beam B. To provide for uniform deposition, the nozzle inserts 58 are angularly displaced 90 degrees from each other in the horizontal plane. This feature allows any complex net-shape object geometry to be generated. The uniformity of deposition is independent of the relative motion of the deposition stage S with respect to the laser beam B.

Since flow of powdered material along any direction of relative movement of the delivery system N with respect to the object being formed is the vector sum of the contributions from each of the nozzle inserts 58, and their combined flow forms a relatively large interaction region which converges with the laser beam B at its focal point, the flow of powdered material is constant for any direction of such relative movement. Since the individual nozzle inserts 58 are replaceable, the aperture through which the powdered material flows can be adjusted to accommodate a particular deposition process; for fine geometries, a smaller aperture can be used, while for large deposition rates a set of larger apertures would be required. Nozzle insert apertures are generally small enough to create an output-gas stream velocity sufficiently high to blow unused powdered material away from the deposition region.

Optical Pyrometer

Not shown in FIG. 7 is an optical pyrometer coaxially aligned with laser beam B to monitor the temperature of the molten powder material. Time-resolved thermal imaging of the deposited structure shows that variations of temperature in the molten zone will result in differing layer thicknesses. In addition, these measurements also show that the substrate temperature will continue to increase with time as the deposition process is continued. These high- and low-frequency thermal variations create instability in the process. To compensate for these variations, a thermal monitoring scheme is included. Either a single-color or multicolor electrooptical pyrometer can be used to solve this problem. The multicolor pyrometer is preferred for this application since it is less sensitive to variations in emissivity and changing transmission of optics due to dust particles. Utilization of the electrical signal from the pyrometer provides yet another method for closed-loop process control and improved process robustness.

Triangulation Position Sensor

To allow workpiece regions to be identified as critical as to surface-finish requirements, feature definition, etc., a sensor can be used to verify layer thickness in-situ. For this application, a laser-based triangulation device T (not shown) can be attached to the delivery system N. The band width of this measurement unit allows real-time, position-sensing data to be used to correct for variations in layer thickness, and provide a further signal for closed-loop process control and adaptive processing. The laser-based triangulation device T uses a diode laser with wavelength different from the deposition laser L to avoid noise problem at the position-sensing detector. An optical filter is included to attenuate the light from the deposition laser L to below detectable levels.

The deposition layer thickness increases as a function of the energy input to a particular location. Experimental data suggest that the deposition layer thickness increases nearly linearly with increasing volumetric exposure. This provides a control methodology for achieving uniform layer thickness in real time. Most control methodologies use a sensor signal which changes with variations in process parameters. Although this method works well for slow-response variables, laser processing usually requires a high-bandwidth signal, i.e., very fast response, to affect the process in real time. Utilization of a velocity signal (i.e. the rate of change in position) from the triangulation device T to control the laser power and maintain a constant volumetric exposure circumvents bandwidth limitations by correcting for variations in component velocity prior to a response, i.e., increased temperature. Additional thermal monitoring can be performed to further reduce this effect. By correcting for this effect before it occurs, a slower-response, thermal-monitoring signal from the optical pyrometer can be utilized for further control.

The triangulation device's laser used for position sensing is mounted such that its beam is collimated and travels coaxial to the deposition laser beam B. The triangulation sensor T is mounted with the delivery system N of FIG. 1 and aligned so that the position sensor T is in the middle of its output range when the delivery system N is positioned such that the optimum deposition condition is achieved. The triangulation device T sends its output signals to processing circuit which produces an output signal proportional to the height of the forming structure. This will typically correspond to the position where the deposition laser beam B is at sharp focus on the deposition stage S.

In one embodiment of this invention a system is provided for the delivery of powder for laser-engineered net shaping which system incorporates freedom from low-frequency fluctuations in flow rate, uniform delivery of the powder thereby eliminating the shadowing effect common to off-axis delivery systems, and introduction of the powder at the beam focus position to minimize beam scattering and promote deposition efficiency.

Laser

The laser L used in this process is a high-power cw, Nd:YAG laser which operates at an output wavelength of 1.064 µm, and has a continuously variable output power from about 1–1800 watt. This laser is typical for industrial materiaal processing applications such as laser welding, cutting, etc. Although this laser is operated as a cw system, it is likely that a pulse ND:YAG laser or a $CO_2$ laser will also work for this application. In fact any laser with sufficient power and reasonable absorption to melt the material would suffice as a laser source.

Deposition Stage

The deposition stage is typical for commercially available positioning stages. The controller is an Aerotech™ controller, and the motion-control software is a version of numerical computer language unique to this system. It is important that the stages are supplied with ways covers to prevent the powder from building up on the ways and causing binding. Other than this feature, there is nothing unusual about the stages. The stages have an accuracy of approximately 0.0001" and, therefore, are well suited for precision applications. The motors are DC servos with built-in tachometers (may be used to provide the velocity signal for feedback control), and encoders to precisely determine the absolute position of the stage relative, to either a home position, or the laser deposition nozzle.

Computer Process Control

Figure 9:
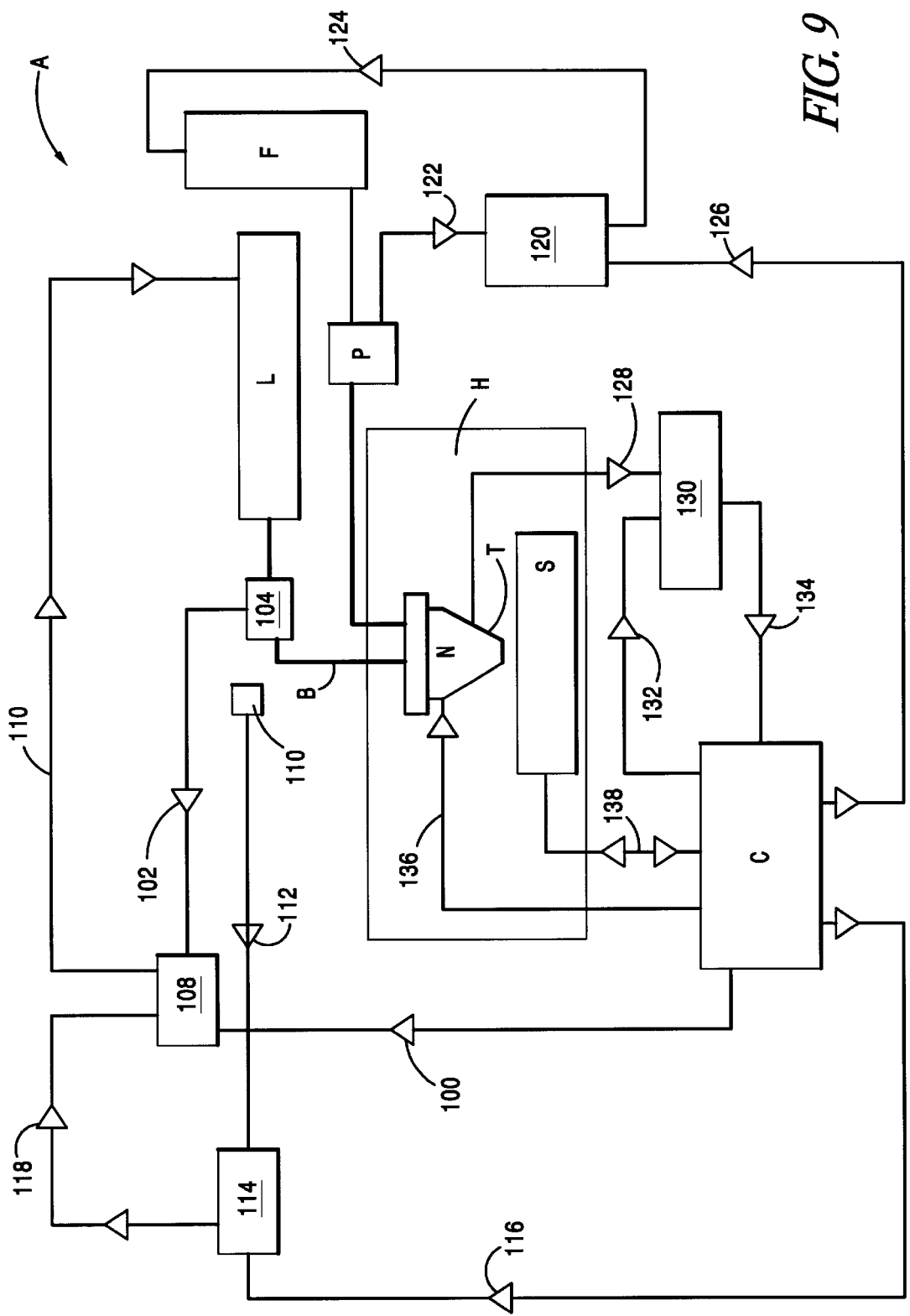
FIG. 9 is an overall schematic of one embodiment of the present invention.

Looking next to FIG. 9, the overall computer control of the laser deposition process will now be described.

A computer controller C is used to map out the deposition of powdered material to produce a given pattern. A computer aided design (CAD) solid model of the object to be produced is converted to an STL file and then electronically sliced into layers of specified thickness using commercially available software routines. Customized software drivers convert the layer information into tool paths information for the deposition process. The file conversion routines identify the regions of each layer that must be filled with the deposited material. The computer C positions the deposition stage S to a position beneath the delivery system N in the region where the deposition is to occur and the deposition process commences. First an outline of the region is deposited in a thin-line section on the deposition stage S and then the areas within the outline are filled using thin-lines of material using a rastering technique. The object layer is produced by scanning the deposition stages S (X-Y axes) in a desired pattern until the specified region is filled. Once a layer is completed, the computer controller C increments the delivery system N vertically (Z axis) away from the built up layer by the thickness of the deposited layer. This process is then repeated until an entire object is created one layer at a time. The entire deposition process occurs under the control of the computer controller C with all of the tool paths specified by the CAD solid model.

Uniform Layer Control

We have determined that a strong linear relationship exists between the volumetric exposure (the ratio of the laser irradiance over the component velocity) and the deposition layer thickness. Velocity signals 100 (i,e., rate of change of position) for the deposition stage S can be accessed at several locations. To maintain a constant exposure, requires a feedback loop to be implemented which the ratio of the velocity signal 100, which is proportional to the laser output power 102 signal, using a fast response detector 104 (<100 µs) to a signal proportional to the velocity signal 100 of the deposition stage S. The ratio can be performed using commercially available electronics or a custom circuit 108. The ratiometer 108, as it might be called, provides an output error signal 110 which is proportional to the difference in the measured exposure ratio and the desired exposure ratio. An exposure error signal 110 is produced to regulate the laser output power in a continuous fashion to again achieve a constant volumetric exposure level. The exposure error signal 110 can be used to control the laser output power either through direct control of the laser power supply or through the use of a continuously variable beam attenuator. The method of laser power control will be dictated by the bandwidth of the attenuation mechanism. For this application, a response time of <1 ms is desired.

Thermal Monitor Feedback

A second control loop is included to ensure that the deposition stage S temperature does not increase with time. Experiments have shown that this effect does indeed occur in an open loop condition. A pyrometer 110, either single color or multi-color, is positioned such that it can stare at the deposition stage S in the deposition area. The advantage offered by a multi-colored pyrometer is that variations in the emmissivty of the deposited structure can be compensated for directly in the optically dirty environment provided in the powder deposition process. The pyrometer 110 provides an electrical signal 112 which is proportional to the temperature at the deposition area. The signal 112 is input to a comparator circuit 114 which compares the measured temperature value to that of a desired temperature value 116 and produces an error signal 118 proportional to the difference between these two values 112 and 118. This error signal 118 is then input to the ratiometer 108 to alter the target exposure ratio value to effectively maintain a constant temperature at the deposition stage S in the deposition area. Maintaining a constant temperature at the deposition stage S and a constant volumetric exposure will provide very controlled layer. Each of these sensors can also be used individually to provide an error signal to make the process more robust.

Powder Flow Sensor Control

A commercially available instrument 120 can be used to Fourier transform the electrical signal 122 from the mass flow sensor P and provide a spectrum of the powder flow frequency components. The same instrument can be programmable to produce an alarm signal when low frequency variations in the powder flow stream are detected and provide a signal 124 proportional to the mass flow for automated control of the powder mass flow rate.

A third control loop uses the volumetric flow rate signal 122 from the powder flow sensor P to achieve a desired powder flow rate. The volumetric flow rate signal 122 is input to an alarm/flow rate controller which is compared to preset flow rate on the alarm/flow rate controller panel or is input to the alarm/flow rate controller from the position control computer C via line input 126. This feature will further enable adaptive software control for varying the deposition layer thickness. Computer control of the powder volumetric flow rate and the volumetric exposure parameter will allow the position control computer C to actively vary the deposition layer thickness to increase the deposition rate, achieve a very good surface finish or tailor material properties. In addition, computer control C of the powder mass flow allows functionally graded or dissimilar composition structures to be fabricated directly from the a CAD solid model by incorporating multiple powder feeders F into the laser deposition system A.

Z-Axis Position Control

A fourth control loop consists of triangulation device T mounted with the powder delivery system N used to measure the relative position between the delivery system N and the deposition area. In one embodiment, a triangulation system T in which a laser source is of a different wavelength than that of the deposition laser L is used. An optical filter can be included to attenuate the light from the deposition laser L to below detectable levels. The laser used for position sensing is mounted such that its beam is collimated and travels coaxial to the deposition laser beam B. The triangulation sensor T is mounted within the powder delivery system N and aligned so that the triangulation sensor T is in the middle of its output range when the powder delivery system N is positioned such that the optimum deposition condition is achieved. This will typically correspond to the position where the deposition laser beam B is at sharp focus on the deposition stage S. A relative position signal 128 from the position sensor T is input to a comparator circuit 130, consisting of either commercially available or custom circuitry, and compared to the predicted z-axis position signal 132 from the position control computer C. An error signal 134 is generated by comparing the predicted z-axis position signal 132 to the actual measured z-axis position signal 128 relative to the deposition substrate S surface. This error signal 134 is input to the position control computer to allow the z-axis increment via the z-axis control signal 136 to achieve a high accuracy. It is conceivable that other types of position sensing hardware can be used to measure the relative position between the powder delivery system N and the deposition stage S surface and also that modifications to the control software will allow the number of deposition layers to be varied to compensate for variations in the deposition layer 65 thickness to achieve a desired accuracy.

Computer control of x-y motion of deposition stage S is via control signal 138. Additionally, computer controller C can provide x-y motion to the deposition stage S via control signal 138.

Improved Material Properties

The deposition process is performed in a controlled atmosphere chamber H which contains an inert gas to inhibit the formation of surface oxide in the deposition area. This allows a minimum laser energy to be used to achieve full melting of the powder powdered material as they are injected into the deposition area. Although deposition can be performed outside the controlled atmosphere chamber H, it is likely that the inert atmosphere promotes full density in the deposited structures and ultimately leads to improved strength and ductility in the deposited structure when a laser conditions are maintained to provide rapid cooling in the deposition area.

Experimental studies have demonstrated that the laser deposition process of the present invention can also be used to obtain unique material properties in the deposited structure. By minimizing the input laser beam B power, simultaneous improvement in yield strength and elongation in 316 stainless steel structures have been obtained. This is believed to occur due to a finer grain structure achieved by rapid cooling. The process parameters deemed to be pertinent to achieve these material properties are a laser power from 50–500 watt, an irradiance value from 100–1000 W/mm$^2$, a component travel speed from 1–200 mm/s, and a deposition layer thickness varying from 0.01 mm to 0.5 mm. For the 316 stainless steel structure deposited using these process parameters, yield strengths of 66 ksi with an elongation of 66% were obtained as compared with a nominal yield strength of 35 ksi, with 50% elongation reported for a typical annealed 316 stainless steel specimens. Increases in both the yield strength and the elongation suggest that this combination of process parameters leads to improved strength and ductility. Given this result, it is likely that components fabricated using this range of process parameters can be fabricated with less material providing a gain in weight to strength ratio.

Additionally, varying the carrier propellant gas can produce different physical, chemical, and structural changes in the object being produced. For example, nitrogen- and carbon-containing gases can be used to harden the material. Similarly, either oxidizing or reducing gases as well as inert gases can be used to effect changes in the material strength properties of the object being produced.

The embodiments discussed above illustrative of the present invention; however, it is contemplated that the use of the invention can involve components having different forms and sizes and that other materials and carrier gases can also be effective in producing complex, net-shape objects. It is intended that the scope of the present invention be defined by the claims appended hereto.

What is claimed is:

1. A system for producing three-dimensional, net-shape objects from powdered material, comprising:
    a) a deposition stage;
    b) a growth surface which moves in accord with the deposition stage;
    c) a laser configured to direct a laser beam onto the growth surface;
    d) a molten region on the growth surface, generated by the action of the laser beam thereon, comprising:
        1) melted material from the growth surface; and,
        2) powdered material which melts on incorporation into the molten region;
    e) a delivery system comprising:
        1) a passageway therethrough whereby said laser beam can be transmitted substantially without attenuation;
        2) a plurality of nozzles circumferentially positioned about said passageway and aligned so as to produce a converging flow of a propellant gas and powdered material mixture such that the apex of such converging flow is substantially directed at said molten region;
        3) a manifold which distributes said propellant gas and powdered material mixture to said plurality of nozzles,
    f) a powder feeder supplying the manifold of said delivery system with a substantially continuous and uniform flow of a propellant gas and powdered material mixture; and,
    g) means for translating the delivery system relative to the deposition stage and for depositing layers comprising melted and resolidified powdered material so as to form three-dimensional, net-shape objects.

2. The system of claim 1, wherein the three-dimensional net-shape objects have a density of at least 90% of the theoretical density of the powdered material.

3. The system of claim 1, further including a closed chamber adapted to house said delivery means and the deposition stage.

4. The system of claim 1, wherein the laser includes means for positioning the focal plane of the laser beam at a substantially fixed distance from the growth surface during deposition.

5. The system of claim 4, wherein said positioning means includes:
   a) triangulation means for determining the distance to the growth surface from the focal plane of the laser beam; and
   b) means for vertically translating the focal plane of the laser beam to maintain the fixed distance.

6. The method of claim 1, wherein the three-dimensional net-shape objects have a density substantially equal to the theoretical density of the powdered material.

7. The system of claim 1, further including means for removing unincorporated powdered material from the growth surface.

8. The system of claim 1, further comprising:
   a) at least two powder feeders, each providing a substantially continuous and uniform flow of different propellant gas and powdered material mixtures to a combination mixer; and,
   b) the combination mixer having inputs for said different propellant gas and powdered material mixtures, an output for the combined flow leading to the delivery system, and a regulating system to control the amount of each said mixture combined to make up said combined flow.

9. The system of claim 8, wherein each powder feeder comprises:
   a) a pressurized hopper adapted to store the powdered material;
   b) a rotary feeder wheel rotatably mounted with the hopper, wherein the rotary feeder wheel has a plurality of flow passageways therethrough positioned in concentric rings about the feeder wheel and each flow passageway is sized to transport a measured amount of powdered material from the hopper;
   c) a slotted propellant gas inlet positioned beneath the rotary feed wheel a adapted to direct a flow of propellant gas through the flow passageways when the slotted propellant gas inlet and the flow passageways cone into registry;
   d) a propellant gas and powdered material mixture outlet positioned above the rotary feeder wheel and substantially in vertical alignment with the slotted propellant gas inlet;
   e) a propellant gas in fluid communications with the slotted propellant gas inlet; and
   f) means for rotating the rotary feeder wheel whereby when a flow passageway containing a measured amount of powdered material comes into registry with the slotted propellant gas inlet and the propellant gas and powdered material mixture outlet, a substantially continuous and uniform flow of a propellant gas and powdered material mixture is directed to said delivery system.

10. The system of claim 1, wherein said powder feeder comprises:
   a. a hopper adapted for storing powdered material;
   b. a rotary feeder wheel rotatably mounted with the hopper and having a plurality of flow passageways sized to transport a measured amount of powdered material spaced in concentric rings thereabout;
   c. a slotted propellant gas inlet positioned beneath the rotary feeder wheel and adapted to direct a flow of propellant gas through the flow passageways when the slotted propellant gas inlet and the flow passageways come into registry;
   d. a propellant gas and powdered material mixture outlet, positioned above said rotary feeder wheel and in vertical alignment with said slotted propellant gas inlet; and
   e. means for rotating the rotary feeder wheel and for transporting the measured amount of powdered material from the hopper via the flow passageways such that when the flow passageways, slotted propellant gas inlet, and the propellant gas and powdered material mixture outlet are all in registry, a substantially uniform and continuous flow of propellant gas and powdered material mixture is directed to said delivery system.

11. The system of claim 1, further including flow sensing means for measuring the rate of flow of powdered material from said powder feeder.

12. The system of claim 1, further including means for determining the temperature of the molten region.

13. The system of claim 12, wherein said means for determining temperature comprises a pyrometer coaxially aligned with the laser beam.

14. The system of claim 12, further including means for regulating laser power based on the temperature of the molten region.

15. The system of claim 1, further including means for regulating the temperature of the molten region.

16. The system of claim 1, further including an automated controller to direct the translation of said delivery system relative to the deposition stage.

17. The system of claim 16, wherein said automated controller also regulates the temperature of the molten region.

18. The system of claim 16, wherein said automated controller also maintains the focal plane of the laser beam at a substantially fixed distance with respect to the growth surface.

19. The system of claim 16, wherein said automated controller also regulates the power level of the laser.

20. The system of claim 1, wherein the powdered material is selected from the group consisting of metals, ceramics, glasses and plastics.

21. The system of claim 1, wherein said propellant gas is selected from the group consisting of: nitrogen-containing gases, carbon-containing gases, inert gases, oxidizing, and reducing gases.

22. The system of claim 1, wherein said translation means comprises:
   a) means for translating the deposition stage in a horizontal plane; and
   b) means for translating the focal plane of the laser beam in a vertical plane.

23. The system of claim 1, wherein said delivery system further comprises means for injecting a shield gas coaxial with the converging flow of powdered material.

24. A method for producing three-dimensional, net-shape objects from powdered material, comprising the steps of:
   a) forming a molten region on a growth surface by directing a laser beam thereon;
   b) generating a substantially continuous and uniform flow of a propellant gas and powdered material mixture;

c) converting said flow into a converging flow by spraying said flow through a plurality of nozzles circumferentially positioned about the laser beam;

d) incorporating a portion of the powdered material contained in said converging flow into the molten region by positioning the apex of the converging flow proximate to said molten region; and, e) translating the molten region so as to deposit layers comprising melted and resolidified powdered material so as to form a three-dimensional, net-shape object.

25. The method of claim 24, further including regulating the power level of the laser so as to regulate the temperature of the molten region.

26. The method of claim 25, further including obtaining a measure of the temperature of the molten region with an optical pyrometer.

27. The method of claim 24, wherein the powdered material is selected from the group consisting of metals, ceramics, glasses and plastics.

28. The method of claim 24, wherein the three-dimensional net-shape objects have a density of at least 90% of the theoretical density of the powdered material.

29. The method of claim 28, wherein the density is substantially equal to the theoretical density of the powdered material.

30. The method of claim 24 wherein the step of generating a substantially continuous and uniform flow of a propellant gas and powdered material mixture further comprises:

a) pressurizing a hopper adapted to store the powdered material;

b) transporting a measured amount of powdered material from the hopper with a rotary feeder wheel rotatably mounted with said hopper, wherein the rotary feeder wheel has a plurality of flow passageways therethrough positioned in concentric rings about the feeder wheel, each flow passageway being sized to transport a measured amount of powdered material from the hopper; and, c) rotating the rotary feeder wheel whereby when a flow passageway containing a measured amount of powdered material comes into registry with a source of propellant gas, a substantially continuous and uniform flow of a propellant gas and powdered material mixture is generated.

31. A system for producing three-dimensional objects from powdered material, comprising:

a) a deposition stage;

b) a growth surface which moves in accord with the deposition stage;

c) a laser configured to direct a laser beam onto the growth surface;

d) a molten region on the growth surface, generated by the action of the laser beam thereon, comprising:

1) melted material from the growth surface; and, 2) powdered material which melts on incorporation into the molten region;

e) a delivery system, comprising:

1) a passageway therethrough whereby said laser beam can be transmitted substantially without attenuation;

2) a plurality of nozzles circumferentially positioned about said passageway and aligned so as to produce a converging flow of a propellant gas and powdered material mixture such that the apex of such converging flow is substantially directed at said molten region;

3) a manifold which distributes said propellant gas and powdered material mixture to said plurality of nozzles;

f) a powder feeder supplying the manifold of said delivery system with a substantially continuous and uniform flow of a propellant gas and powdered material mixture; and, g) means for translating the delivery system relative to the deposition stage and for depositing layers comprising melted and resolidified powdered material so as to form three-dimensional objects.

32. The system of claim 31, wherein the three-dimensional objects are bulk materials.

33. A method for producing three-dimensional objects from a plurality of powdered materials and their combinations, comprising the steps of:

a) forming a molten region on a growth surface by directing a laser beam thereon;

b) generating a plurality of substantially continuous and uniform mixture flows, each said mixture flow comprising a propellant gas and at least one of the plurality of powdered materials;

c) combining the plurality of substantially continuous and uniform mixture flows into a predetermined master flow, the composition of which is determined by regulating the amount of each of the plurality of substantially continuous and uniform mixture flows that is combined into said master flow;

d) converting said master flow into a converging flow by spraying said master flow through a plurality of nozzles circumferentially positioned about the laser beam;

e) incorporating a portion of the mixed powdered materials contained in said converging flow into the molten region by positioning the apex of the converging flow proximate to said molten region; and f) translating the molten region so as to deposit layers comprising melted and resolidified powdered materials so as to form a three-dimensional object.

* * * * *